E. & J. M. RUDDICK.
Gang-Harrow.
No. 205,909.      Patented July 9, 1878.
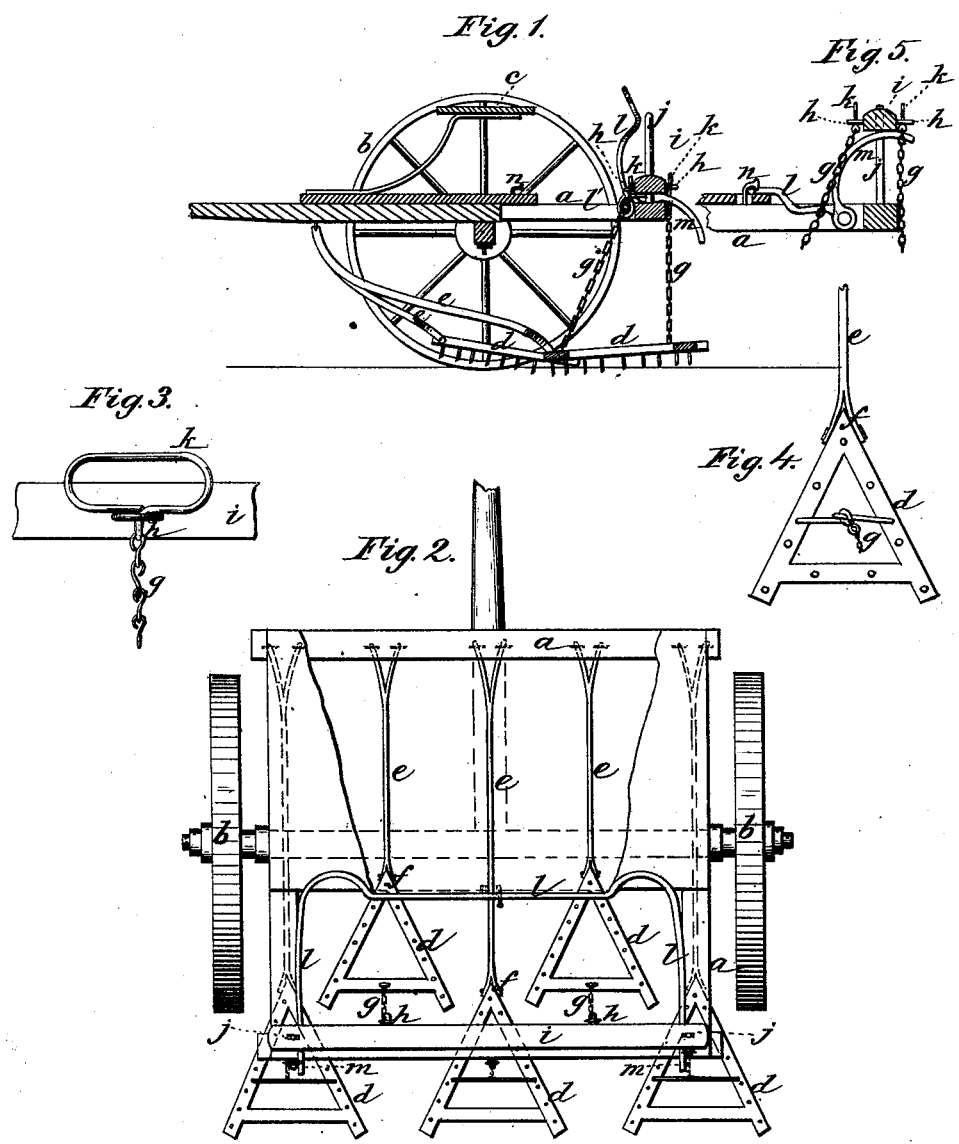

UNITED STATES PATENT OFFICE.

ELWOOD RUDDICK AND JACOB M. RUDDICK, OF JACKSON COUNTY, IND.

IMPROVEMENT IN GANG-HARROWS.

Specification forming part of Letters Patent No. 205,909, dated July 9, 1878; application filed February 4, 1878.

*To all whom it may concern:*

Be it known that we, ELWOOD RUDDICK and JACOB M. RUDDICK, of the county of Jackson and State of Indiana, have invented a new and useful Improvement in Harrows, of which the following is a specification:

We have improved the wheeled harrow in particulars of construction, by which greater convenience and more effective working are obtained. The triangular harrows are arranged in groups and connected to the frame, so as to be drawn like the drills of a seed-planter, the connection of the points of the harrows being such, however, as to keep them apart and in line with their frame-connecting bars. The harrows are connected by chains, having a central attachment therewith, and with loops on a cross lifting-bar arranged upon vertical guide-pins on the frame in rear of the carrying-wheels. This connection is peculiar in allowing the harrows to be raised together by the lifting-bar, or separately by providing each chain with a grasp-hold to maintain its connection with the bar-loop, and by which the driver may grasp the chain-hold and raise any one of the harrows to force it from obstructions and from stubble or trash, while all the harrows may be raised and held up by means of the lifting-bar upon its guide-pins by a lifting-lever pivoted to each side of the frame, and having curved arms at each end, upon which said bar rests in going to and from the field.

Referring to the drawings, Figure 1 represents a cross-section of a wheeled harrow embracing our improvements; Fig. 2, a top view of the same, showing the arrangement and manner of constructing and bracing the harrows; Fig. 3, a detail, showing the grasp-hold of the harrow-chain, by which the harrows can be raised separately; Fig. 4, one of the harrows, showing its bracing pivoted point connection with the draw-bar; and Fig. 5, a detail of the lifting device.

The frame $a$ is mounted upon side carrying-wheels $b$, and supports the driver's seat $c$ above the axle. The harrows $d$ are small triangular frames, arranged in rows, preferably three in rear and two front intermediate ones, or one in front and two behind. They are pivoted to the front cross-bar of the frame by bars $e$, forked at both ends, so as to brace them laterally with the frame and keep the harrows in line with said bars $e$, and from each other by the forked ends $f$, embracing the points of the harrows, while allowing them to rise and fall upon their pivot-connections.

Chains $g$ connect with the harrows centrally, and with the loops $h$ on the opposite sides of a cross lifting-bar, $i$, arranged upon vertical pins $j$ at each side of the rear ends of the frame. The upper ends of the chains are provided with grasp-holds $k$, which keep them in the bar-loops $h$, and by which the driver can raise each harrow separately, when necessary, to free it from obstructions, while all the harrows may be raised and held up by the lifting-bar $i$ by means of a lever, $l$, pivoted at $l'$ to the side bars of the frame, and provided with rearwardly-curved arms $m$, upon which the lifting-bar $i$ rests, so that by depressing said lever the curved arms raise the cross-bar, and with it the harrows, which can be held up by a catch, $n$, on the frame, springing over the hand-rod of said lever. The central point of the chain attachment with the harrows gives the advantage of raising them in horizontal positions upon their pivot-connections with the draw-bars.

A single row of harrows may be used if desired; but their arrangement in rows intermediately, as shown, is preferred, as more completely and speedily preparing the soil in proper condition to receive the seed.

The front intermediate harrows are connected to the inner side of the lifting-bar, and the rear row of harrows to the rear side of said bar, with their chain-grasps $k$ within convenient reach of the driver.

It will be seen that the lifting-bar is held in place by its guide-pins $j$, and rests upon the convex sides of the curved arms $m$, so that the latter, while having no fixed connection with said bar, act as cams to lift it when raising the harrows. This vertical movement of the bar $i$ gives the advantage of attaching the lifting-chains to both sides thereof, which is necessary in the described arrangement of the harrows, for it is obvious that the front row could not be lifted by chains connecting at the back of the bar.

We claim—

1. In a wheeled harrow, the lifting cross-bar $i$, arranged upon the vertical fixed guide-pins $j$, and having loops *h* on its opposite sides, in combination with the chains *g*, having the hand-holds *k*, resting upon said loops, the lifting cam-armed lever *l m*, and the harrows *d*, all constructed and arranged as and for the purpose set forth.

2. The lifting-lever *l*, having curved cam end arms *m*, in combination with the harrows, the lifting cross-bar *i*, and its guide-pins *j*, said bar being supported upon the curved arms and raised thereby, as set forth.

<div style="text-align:right">ELWOOD RUDDICK.<br>JACOB M. RUDDICK.</div>

Witnesses:
 HENRY SWAIN,
 RICHARD F. WHITE.